United States Patent [19]

Bogardy

[11] Patent Number: 4,968,534
[45] Date of Patent: Nov. 6, 1990

[54] METHOD AND APPARATUS FOR PATTERN IMPREGNATION OF A POROUS WEB

[75] Inventor: Lawrence S. Bogardy, Barlet, Tenn.

[73] Assignee: NPD Corp., Memphis, Tenn.

[21] Appl. No.: 297,763

[22] Filed: Jan. 17, 1989

[51] Int. Cl.[5] .................. B05D 5/00; B05D 1/32; B05D 3/12; B05C 3/20

[52] U.S. Cl. ................... 427/282; 427/288; 427/296; 427/350; 118/50; 118/406; 118/410; 118/415

[58] Field of Search ............. 427/282, 296, 350, 288; 118/50, 406, 410, 415

[56] References Cited

U.S. PATENT DOCUMENTS

3,084,661  4/1963  Roberts ...................... 118/406 X
3,470,848  10/1969  Dreher ........................... 118/50

Primary Examiner—Evan Lawrence
Attorney, Agent, or Firm—Hurt, Richardson, Garner, Todd & Cadenhead

[57] ABSTRACT

A method and apparatus for impregnating a porous web with a chemical. The impregnating method includes applying a vacuum to one side of the web sufficient to evacuate air from the web, applying impregnating chemical into the web in a selected pattern on the same side of the web, followed by drying the web. The apparatus includes a vacuum chamber for evacuating air from the web, a manifold for applying the impregnating chemical into the web located on the same side of the web as the vacuum chamber and a stencil for restricting the application of the chemical to selected areas of the web.

37 Claims, 4 Drawing Sheets

METHOD AND APPARATUS FOR PATTERN IMPREGNATION OF A POROUS WEB

BACKGROUND OF THE INVENTION

1. Field of the Invention

This invention relates to an apparatus and process for chemically impregnating paper and other non-woven web, and is more particularly concerned with an apparatus which applies a vacuum to the web, then delivers a chemical solution to the web in a preselected pattern, to alter or to enhance the physical characteristics of the web.

2. Description of the Prior Art

Manufacturers of products made of a non-woven web, such as paper and paperboard, have long known the desirability of treating the web with a chemical to create or enhance desired features in the product. For example, in the manufacturing of containers designed to hold liquid, such as paper milk cartons, it is essential to treat the container with a chemical sealant in order to make the carton impervious to the liquid. Other web products are chemically treated to increase their stiffness or strength. In packaging for containers or bottles, such as paper containers for soda or beer, portions of the container, but not necessarily the entire container, must be strengthened. These portions include the high stress areas such as the tops and bottoms, the heel areas, and integral carrying handles and fingerholes. In other applications, it is desirable to increase the tensile strength or tear resistance at certain areas, but not at others. These include web packaging that is intended to be opened by tearing the package in a selected area.

When, for example, the areas around the fingerholes, integral handles, or corners in a paperboard carton blank need to be reinforced, it is more economical to chemically strengthen these selected areas, only, thus conserving chemicals and so reducing per unit treatment cost. In other situations, it even can be detrimental to treat the entire web. For example, in some applications the quality of stiffness may be desirable on flat surfaces, but not in areas which must be scored to form the finished product. Applying a chemical stiffener to areas prior to their being scored, might cause these areas to crack or fracture along the score-line when folded.

Web such as cloth or paperboard have been chemically treated, or impregnated, with a variety of methods and devices utilized to impregnate the web with chemicals such as dyes, bleaches, sealants, resins, and other finishing compounds. It should be understood that the term "impregnate" as used herein, refers only to the chemical treatment or application of the chemical into the web. It is not intended that the term "impregnate" imply to what degree the web is exposed to the chemical, that is, either complete saturation of the web or decorative printing or surface coating of the web. Chemical treatment of the web can be accomplished by treating the surface of the web using a gravure press, or by using blade coating, roller coating, flexographic, silk screening or stenciling methods commonly known in the printing industry. The degree of impregnation of the web fibers using these methods is usually not as pronounced as using methods which include either relatively long exposure of the web to a chemical bath, or vacuum preparation prior to chemical treatment.

In some prior art devices, the web is driven through a chamber, and the chemical, or impregnant, is delivered under Pressure to the web. For example, in U.S. Pat. No. 4,588,616 the web is fed under a mandrel which is received in a saddle block to define a chamber with a geometrically convergent zone. As the web passes through the zone, the chemical saturant within the zone is forced under pressure into the web. Another device similar in design and function is disclosed in U.S. Pat. No. 4,411,216. U.S. Pat. No. 4,702,943 discloses chemical saturation under pressure, and also incorporates a stencil which is driven in the direction of and at the same linear speed as the web. The stencil is intended to separate selected portions of the web from a pressurized reservoir, or bath, of saturant. In this device, however, there is a possibility that unintended portions of the web could become saturated, because the stencil is exposed to the entire pressurized bath, and therefore, intimate contact of the stencil to the web is absolutely critical. This reference also discloses a device which utilizes both high and low pressure to force saturant into the web. The combination of both high and low saturant pressurization zones allows for relatively increased saturation of selected areas of the treated web. In a continuation-in-part of this reference, U.S. Pat. No. 4,740,391, the device disclosed therein also utilizes selectively aligned grooves which define even lesser pressurized saturation zones, which further reduce the amount of saturation of the web exposed to these areas. The entire web, however, is exposed to the saturant in this embodiment, when a stencil is not used. Further, the dividing line between the saturated portion and unsaturated portion of the web is abrupt. As discussed herein, the method of the present invention allows for selected degrees of impregnation and, where desirable, permits the impregnation of an area to either taper off in degree, or to end abruptly.

Other devices which deliver pressurized chemical to a web also subject the web in a prior step to a partial vacuum, in order to remove air which is held within the web. It has long been known that removing the air on the surface of and within the web allows for a higher degree of web impregnation during the treatment step. U.S. Pat. No. 3,644,137 broadly discloses the concept of subjecting the web to a partial vacuum prior to exposing the web to the chemical. U.S. Pat. No. 4,590,099 discloses an apparatus which includes a chamber divided by seals to define a low pressure preparation zone and a high pressure treatment zone. The web is subjected to the partial vacuum in the low pressure zone, and then is subjected to the pressurized saturant for the saturation of the web. The device utilizes squeeze rollers to complete an air lock to the high pressure zone, and to squeeze excess liquid from the web. The entire web is saturated in this device.

In U.S. Pat. No. 3,797,281, a different device is employed to impart a vacuum to a web prior to impregnation. The vacuum box and impregnant box, or liquor box, are juxtaposed above the web, and the chemical or impregnant is applied through a dispensing slot, as opposed to subjecting the web to a bath. A rubber sealing belt is utilized to contain the vacuum around the web. This device, however, impregnates the entire web and does not employ any means to apply the chemical to selected areas, only.

The general concept of selective application of chemical to a web is disclosed in U.S. Pat. No. 4,617,223. While this reference discusses many advantages of selective application, no specific apparatus is disclosed in detail. The method disclosed utilizes a printing or screening apparatus such as a flexographic printing process, gravure printing or stenciling.

While the prior art devices discussed disclosed various methods for saturating and impregnating a web, none discloses a highly efficient device capable of subjecting the web to a partial vacuum, then impregnating the web in a preselected pattern only. The present invention overcomes the limitations of the prior art of both printing devices and saturating devices, and further is capable of selectively treating large quantities of web per unit time in this manner.

SUMMARY OF THE INVENTION

Briefly described, the invention comprises an for passing a non-woven web through a preparation zone and then through a treatment zone. The preparation and treatment zones are defined by a manifold assembly which includes vacuum means for subjecting the web to a selectively controlled, partial vacuum, thus evacuating air from the surface of and within the non-woven web. This is referred to as the preparation of the web. From the preparation zone, the web is then immediately passed to a treatment zone, where a chemical impregnant is applied to the web before air can reenter the pores of the web. Since the air has been evacuated from the web pores prior to chemical treatment, the chemical applied to the web does not have to displace the air prior to impregnating the web. This allows for a higher degree of selective impregnation, while requiring less time to impregnate the web to the desired degree. The commercial desirability of these features is that the web can thoroughly be treated in less time than in devices which utilize only pressurized impregnation or complete saturation without vacuum preparation. The vacuum manifold and chemical manifold are arranged in a plane so that the web passes under a flat, planar surface during preparation and treatment. In addition, pattern or stencil means is provided to apply the impregnant in preselected areas of the web, only. This stencil is in the form of a polymer belt, such as polyesters or teflon fiber, wire mesh or plastic, which is driven between the manifold assembly and the web. A plate or endless polymer belt can be disposed below the manifold assembly to assist in creating a seal around the web, if necessary.

In a second embodiment, a manifold assembly, which is cylindrical or drum-shaped rather than planar, also includes vacuum means for preparing the web, followed by impregnation means for applying the chemical. A cylindrical pattern means or stencil rotating around the cylindrical manifold assembly, permits the chemical to contact the web only in preselected areas to define the desired pattern. An endless polymer belt can be disposed below the manifold assembly to provide an effective seal against loss of vacuum.

In operation, a large roll of non-woven web, such as paper, is positioned so that the paper can be fed into the impregnating apparatus in a continuous manner. The web is driven through the apparatus so that the web is below and in contact with the stencil means. The stencil means is moved under the manifold assembly at the same rate as the web is driven through the apparatus, in order to uniformly apply a repetitious pattern to the web. As the web passes beneath the vacuum means, a partial vacuum is created between the vacuum means and the endless belt, or the undercoated web, thus evacuating the air from the surface of and within the web.

The amount of vacuum applied by the vacuum means is dependent upon the speed of the web and the degree of impregnation desired. Further, the amount of suction applied by the vacuum means is selectively controlled by a controller which increases or decreases the suction applied, proportionately to any increase or decrease in the rate of the web through the apparatus. The web is then driven under the impregnation means, which delivers the chemical to the web. The stencil, however, allows the chemical to contact the web only at selected areas in a pattern, and in desired concentrations. Since the web is not in contact with or subjected to a reservoir or chemical bath, the impregnation of the web is more efficiently controlled. Excess chemical is then preferably removed by a second vacuum means located adjacent to the impregnation means and on the opposite side of the impregnation means from the vacuum means. Further, the process can be repeated on the treated web using different chemical impregnates, thus creating multiple patterns of different impregnants.

Accordingly, it is an object of the present invention to provide an impregnation apparatus, or impregnator, which is inexpensive to manufacture, durable in structure, and efficient in operation.

Another object of the present invention is to provide an impregnator which efficiently impregnates only selected portions of a non-woven web.

Another object of the present invention is to provide an impregnator which can selectively control quantities of Another object of the present invention is to provide an impregnator which can apply progressively reduced or increased quantities of chemical to a selected portion of a web.

Another object of the present invention is to provide an impregnator which selectively impregnates a web in a continuous manner.

Another object of the present invention is to provide an impregnator which impregnates a web at a relatively high speeds.

Another object of the present invention is to provide an impregnator which applies a partial vacuum to a web prior to applying the chemical to the web.

Another object of the present invention is to provide an impregnator which incorporates a stencil that utilizes a dot matrix arrangement of holes through the stencil to form a pattern.

Another object of the present invention is to provide an impregnator in which the stencil can be readily removed and replaced by other stencils.

Another object of the present invention is to provide an impregnator in which the amount of suction applied to the web is automatically, selectively controlled.

Another object of the present invention is to provide an impregnation method in which a partial vacuum is applied to a non-woven web, prior to delivering a chemical to the web in preselected portions of the web.

Another object of the present invention is to provide an impregnation method in which a large quantity of web is impregnated at selected areas, in a continuous manner, and at relatively high speeds.

Another object to the present invention is to provide an impregnation method in which the amount of vacuum applied to the web is automatically adjusted depending upon the rate of the web through the impregnator.

Other objects, features and advantages of the present invention will become apparent from the following description when taken in conjunction with the accompanying drawings wherein like characters of reference designate corresponding parts throughout the several views.

DESCRIPTION OF THE PREFERRED EMBODIMENTS

Figure 1:
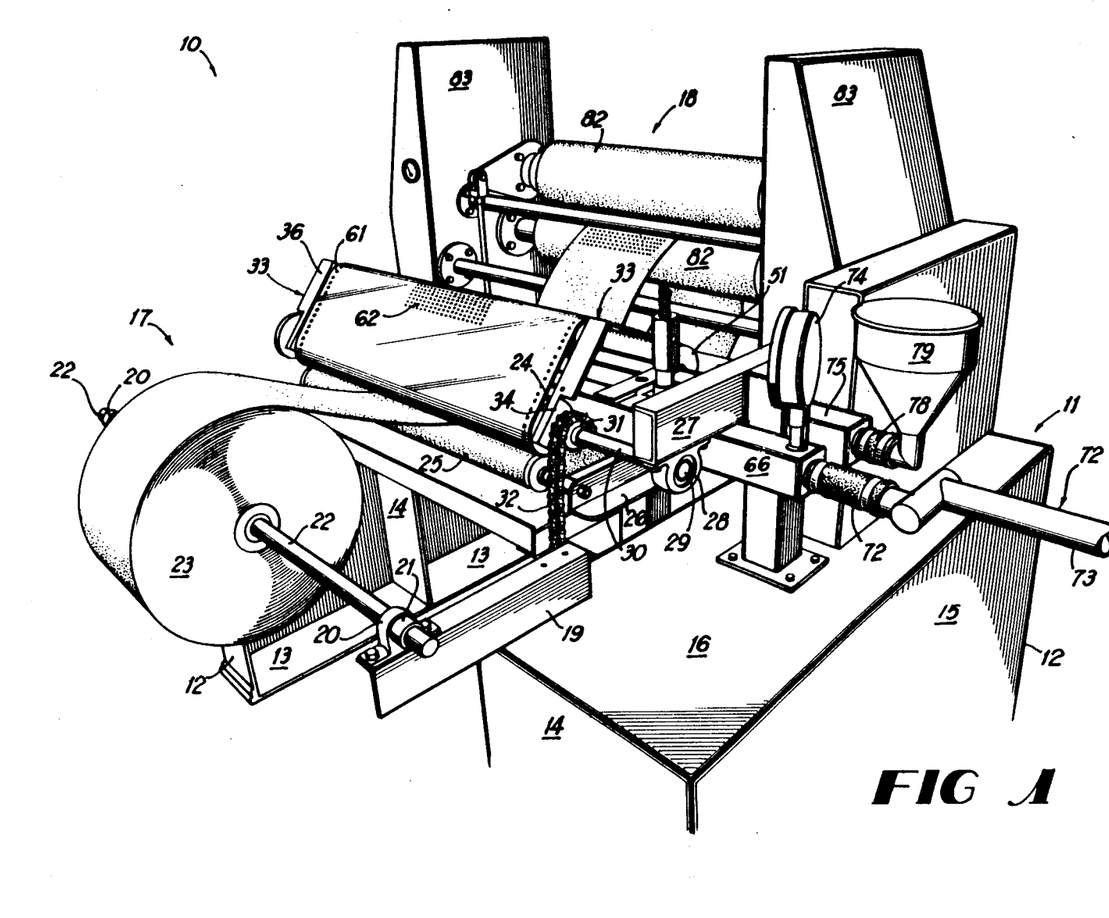
FIG. 1 is a perspective view of a first embodiment of the present invention.

Referring now to the embodiments chosen for the purpose of illustrating the present invention, FIG. 1 depicts a pattern impregnation apparatus or impregnator 10 having an upstanding support frame 11. Frame 11 can be of any suitable configuration sufficient to support the structures hereinafter described, and need not be limited to the elements specified herein. For the purpose of illustrating one such a structure, frame 11 includes tandem, upright frame members 12. Frame members 12 include lower support panels 13, upstanding support panels 14, side panels 15, and top panels 16. Frame 11 is preferably made of steel, the panels of which being welded together to ensure structural integrity. For the purposes of description, apparatus 10 and its included elements have forward or in-feed end 17 and rearward or out-feed end 18.

Securely mounted to the forward end 17 of frame 11 are support brackets 19. Brackets 19 are angled, steel brackets which are cantilevered from the forward end 17 of frame 11. Supported on brackets 19 are pillow blocks 20 which house journals 21. Freely journaled by journals 21 is feed shaft 22. A roll of non-woven web 23 is supported by feed shaft 22, as shown in FIG. 1. Web 23 can be any type of non-woven material capable of being fed through apparatus 10, such as paper, paperboard, corrugated cardboard, liner board, box board, carton stock, carrier board, filters, and gaskets or the like. Web 23 is then fed between upper idler 24 and lower idler 25. Idler 25 is freely supported at either end by support brackets 26. Support members 27 support downwardly extending pillow blocks 28 which house journal 29. Journals 29 freely journal shaft 30 of idler 24 therein. Idler 24 freely rotates about shaft 30 being journaled thereon, and is not pin sprockets 31 (one not being shown). Sprockets 31 will not turn around shaft 30, but are securely mounted to shaft 30 to turn therewith. Engaging the periphery of pin sprockets 31 are sprocket chains 32, which are received around sprockets 31, as shown in FIG. 1, and hang freely downwardly between frame members 12. Weights (not shown) are attached to the lower, free ends of chains 32. The gravitational force upon the weights tends to pull downwardly on chains 32, and thus attempts to rotate sprockets 31, and therefore shaft 30 fixed thereto, in a counterclockwise direction from the view shown in FIG. 1.

Figure 2:
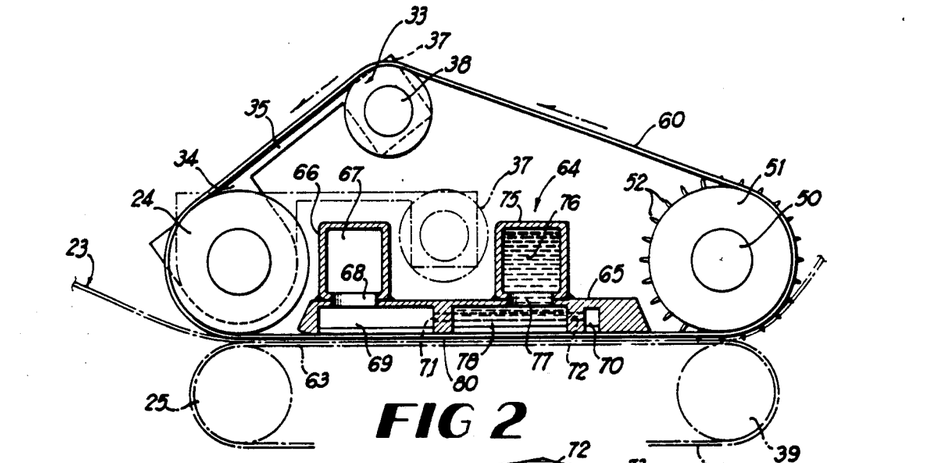
FIG. 2 is a longitudinal, cross-sectional view of the manifold assembly depicted in FIG. 1, taken generally along the channels forming the herringbone pattern in the manifold assembly.

Also secured to each sprocket 31 are identical, inverted, U shaped take-up frames 33. Take-up frames 33 include plates 34 securely attached to respective sprockets 31, and arms 35 extending from plate 34, arms 35 having actuating flange 36. Arms 35 also support at their other end, downwardly extending plates 37. Between each respective plate 37 is journaled idler roller 38, which freely rotates between plates 37. The turning of sprockets 31 causes the rotation, either clockwise or counterclockwise, of frames 33 in a limited angle of rotation. Therefore, idler roller 38 is biased in the same direction and through the same angle of rotation as frames 33. FIG. 2 depicts frames 33 and idler 38 in an upwardly biased position, and also in a lowered position, in phantom lines.

Shaft 50 is positioned rearwardly of frames 33 and is journaled at either end by journal means (not shown) which are secured to each frame member 12, respectively. Spaced drive sprockets 51 are secured to each end portion of shaft 50, so as to turn therewith. As is shown in FIG. 2, the longitudinal axes of idler 34, idler 38, and shaft 50 are spaced in a triangular fashion when frames 33 are in an upwardly biased position. Shaft 50 is driven by suitable means and in timed registration with web drive roller (not shown), as discussed hereinafter.

Received on rollers 34 and 38 and sprockets 51, is pattern means or stencil 60. Stencil 60 is in the form of an endless polymer belt and is preferably made of a flexible, synthetic material having a low coefficient of friction, such as polyesters, teflon fiber, plastic, or wire mesh. Stencil 60 should have a low vapor transmission rate, should be unaffected chemically by the chemical impregnant, and have a high flexural strength. Stencil 60 is substantially unperforated but includes pattern 62 of holes imprinted therein in a dot matrix fashion, as is described in more detail hereinafter. Any desired pattern can be applied to stencil 60 in this manner. Stencil 60 includes along its outer edges, equidistantly spaced, aligned drive holes 61 which receive pins 52 of sprockets 51. As shaft 50 is turned, sprockets 51 drive stencil 60 around sprockets 51 and rollers 34 and 38 in a counterclockwise direction, as illustrated by arrows, from the view shown in FIG. 2. Inverted U-shaped take-up frames 33 are biased in a counterclockwise fashion to take up any slack in pattern 60 between sprockets 51, idler 34, and idler 38. As depicted in FIG. 2, web 23 passes between rollers 25 and 24 and underneath stencil 60. By biasing frames 33 downwardly, stencil 60 can be slackered and easily removed from assembly 10. Different stencils 60 incorporating various patterns 62 can, therefore, be readily utilized.

Web 23 can be driven through apparatus 10 by being pulled by a suitable drive/storage roller (not shown). This drive/storage roller can also serve to store treated web 23, mechanically timed registration with the shaft 50 by any suitable means well known in the art, such as a timing chain assembly, n order to ensure that stencil 60 travels between roller 24 and sprockets 51 in the same direction as web 23 and at the same linear rate as web 23. Web 23 alternatively can be driven through apparatus by the contact of web 23 with belt 63, which further presses web 23 against stencil 60. Belt 63 is carried by idlers roller 25 and roller 39 journaled by frame members 12 below sprocket 51. If belt 63 is used to drive web 23, roller 39 would be a mechanically driven roller in timed registration with shaft 50, as previously discussed.

Figure 3:
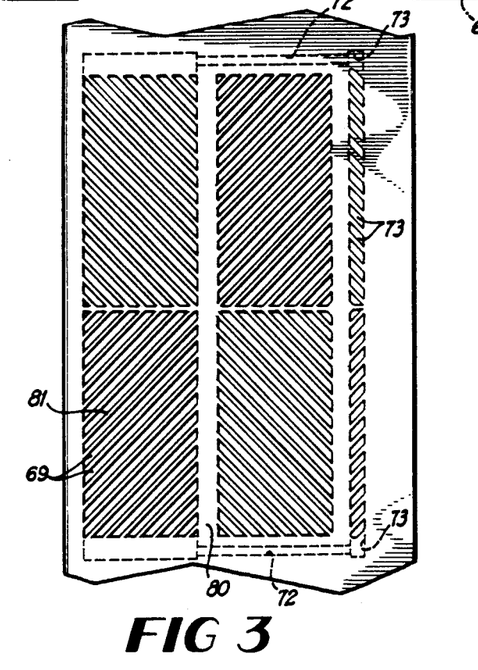
FIG. 3 is a bottom plan view of the manifold assembly of FIG. 2.

Manifold assembly 64 is disposed above stencil 60 and between idler 24 and shaft 50, as shown in FIG. 2. Manifold assembly 64 includes rectangular, laterally disposed plate 65 upon which is mounted tubular member 66, defining vacuum chamber 67. Vacuum chamber 67 communicates through passageway 68 to vacuum port 69 formed in plate 65. Formed in plate 65 rearwardly of and coplanar with port 69, is longitudinal suction port 70. Second vacuum chamber or port 70 communicates through spaced, parallel bored passageways 71 in plate 65, to suction port 69. As is further discussed, the suction applied through chamber 67 to port 69, is also applied through passageways 71 to port 70. Tubular member 66 is closed at one end and communicates through its other end through lines 72 and 73 to a vacuum pump (not shown). Tubular member 75 mounted on plate 65 defines impregnant or chemical chamber 76 which communicates through passageway 77 to port 78 formed in plate 65 and coplanar with ports 69 and 70. Tubular member 75 is closed at one end and communicates at its other end through hose 78 to chemical reservoir 79. Reservoir 79 is depicted in FIG. 1 as an inverted, frustoconical container for the purposes of illustration, but can be of any suitable size or shape sufficient to contain the chemical impregnant delivered to chamber 76. Examples of chemicals which can be successfully delivered by this device include sodium silicate for fire retardation, various latex compounds for strength and stiffness, florocarbon compounds for grease and oil resistance, acrylic vinyl acetate mixtures for stiffness and tear resistance, and liquid polyisocyanates that react with hydroxyl groups in paperboard to form a cured polyurethane reinforcement. Manifold assembly 64 is supported at each end by any appropriate frame means to respective frame members 12. Channels 81 are milled into lower surface or wall 80 of plate 65 and are preferably arranged in a herringbone pattern, as shown in FIG. 3. These channels communicate with vacuum port 69, chemical port 78, and vacuum port 70, respectively. Herringbone patterned channels 81, allow the vacuum to be applied to the web passing beneath assembly 64, but prevent stencil 60 or web 23 from being deformed or pulled into vacuum port 69 or vacuum port 70. Further, the herringbone pattern of channels 81 ensures that all areas of the web 23, except the borders, will pass under at least one of the channels 81, and therefore, each area of web 23 can be treated, if desired. Channels 81 also reduce the drag on web 23 and provide for more even application of the chemical impregnant. Alternatively, because of the relatively narrow width of port 70, a slot in wall 80 can be employed, instead of the herringbone channels 81, under port 70.

Web 23 passes beneath assembly 64 and stencil 60, and thereafter passes between nip rollers 82. Nip rollers 82 are journaled between upstanding support standards 83, and function to keep web 23 in proper alignment as it passes through apparatus 10. As discussed, an appropriate mechanically driven drive/storage roller (not shown), as is well known in the art, is finally incorporated rearwardly of frame 11, to pull web 23 through apparatus 10 and to store treated web 23.

In operation, web 23 is pulled in continuous fashion between idlers 24 and 25 and beneath manifold assembly 64 and stencil 60. A vacuum is applied in vacuum port 69 to web 23 in order to evacuate the air from the surface of and within the pores of web 23. In treating webs which are very porous, sealing belt 63 carried by idler roller 25 and roller 39 may be needed to be positioned below stencil 60 in order to create a proper seal, and to ensure that the vacuum is communicated through passageways 71 to second vacuum port 70. In other applications in which the web is not as porous, or especially in situations in which the bottom of the web has previously been treated with an impervious solution, sealing belt 63 may not be needed to create a seal. Belt 63 can also be utilized to press the web firmly against stencil 60 if necessary. After web 23 has been subjected to the vacuum applied through port 69 at the preparation zone, it immediately passes beneath in the treatment zone to chemical port 78, which is filled with the desired impregnant or chemical. The chemical runs by gravity from the reservoir 79 through chamber 76 and into port 78. The chemical, therefore, flows through stencil 60 and impregnates web 23 passing beneath chamber 78. The dot matrix pattern 62 on the stencil 60 permits the chemical to contact the web 23 only at the preselected pattern 62.

Those skilled in the art understand that the pattern of holes through stencil 60 can be of any design by perforating stencil 60 with selected diameter holes in a dot matrix pattern. Since larger diameter holes will permit more fluid to contact the web 23 than will smaller diameter holes, the amount of chemical contacting the web 23 can be tapered off by constructing the pattern 62 with holes of progressively decreasing diameters. This prevents an abrupt edge or line of treated and untreated web 23, thereby eliminating stress lines and points of future failure of cartons. If it is desired to have an abrupt line of treated and untreated areas on web 23, this, of course, can be accomplished by providing a dot matrix pattern of holes equal in diameter, up to the edge of the pattern 62. After the web 23 passes under chemical chamber 78, it immediately passes beneath second vacuum port 70, which removes excess chemical from the web 23. The chemical which is removed from the web 23 through port 70 is channeled through passageway 71 and into vacuum chamber 67. The vacuum chamber 67 is connected to a liquid trap (not shown) which collects the excess chemical and delivers this excess chemical through appropriate lines back into reservoir 79. It is well understood in the art how such a trap to remove the fluid is incorporated in chamber 67, and it is not further discussed herein. If especially deep penetration of web 23 is desired, apparatus 10 can incorporate a manifold assembly having a plurality of alternating vacuum chambers and impregnating chambers, for a series of evacuations and chemical treatments of the web.

A controller, not shown, electronically controls the vacuum pump (not shown) in order to selectively control the amount of suction applied through ports 69 and 70 to web 23. Such a controller preferably, automatically increases or decreases the suction applied through ports 69 and 70 depending upon the rate at which web 23 is driven through apparatus 10. The controller, therefore, includes the appropriate sensing apparatus to determine the rate of web 23, and should control the vacuum pump to apply increased suction to web 23 as the rate of web 23 is increased through apparatus 10. Some experimentation is required in order to determine the amount of suction applied by the vacuum pump verses the rate of web 23 through apparatus 10, but it has been determined that the relationship of the speed of the web 23 verses the amount of suction is generally linear. This relationship will vary depending upon the properties of the chemical and of the web 23. For a given rate of web 23 through apparatus 10, increasing the vacuum will increase the degree of impregnation of web 23.

It has been found that apparatus 10 can treat web 23 at a rate of from 150 feet/minute to 650 feet/minute, with 400 to 450 feet/minute being a typical rate providing an acceptable result for most chemicals and types of web 23. The amount or quantity of chemical impregnated into a web 23 is dependent upon the amount of suction applied, the properties of the web, and the viscosity and amount of solids in the chemical. It has been found generally that, using water as a reference liquid, apparatus 10 can apply to a forty-two (42) pound liner board approximately 6 pounds of liquid per MSF (thousand square feet) at a suction of 10 inches mercury, and can apply 25 pounds of liquid per MSF at 27 inches mercury. This application can be accomplished at a rate of approximately 400 feet per minute.

Figure 4:
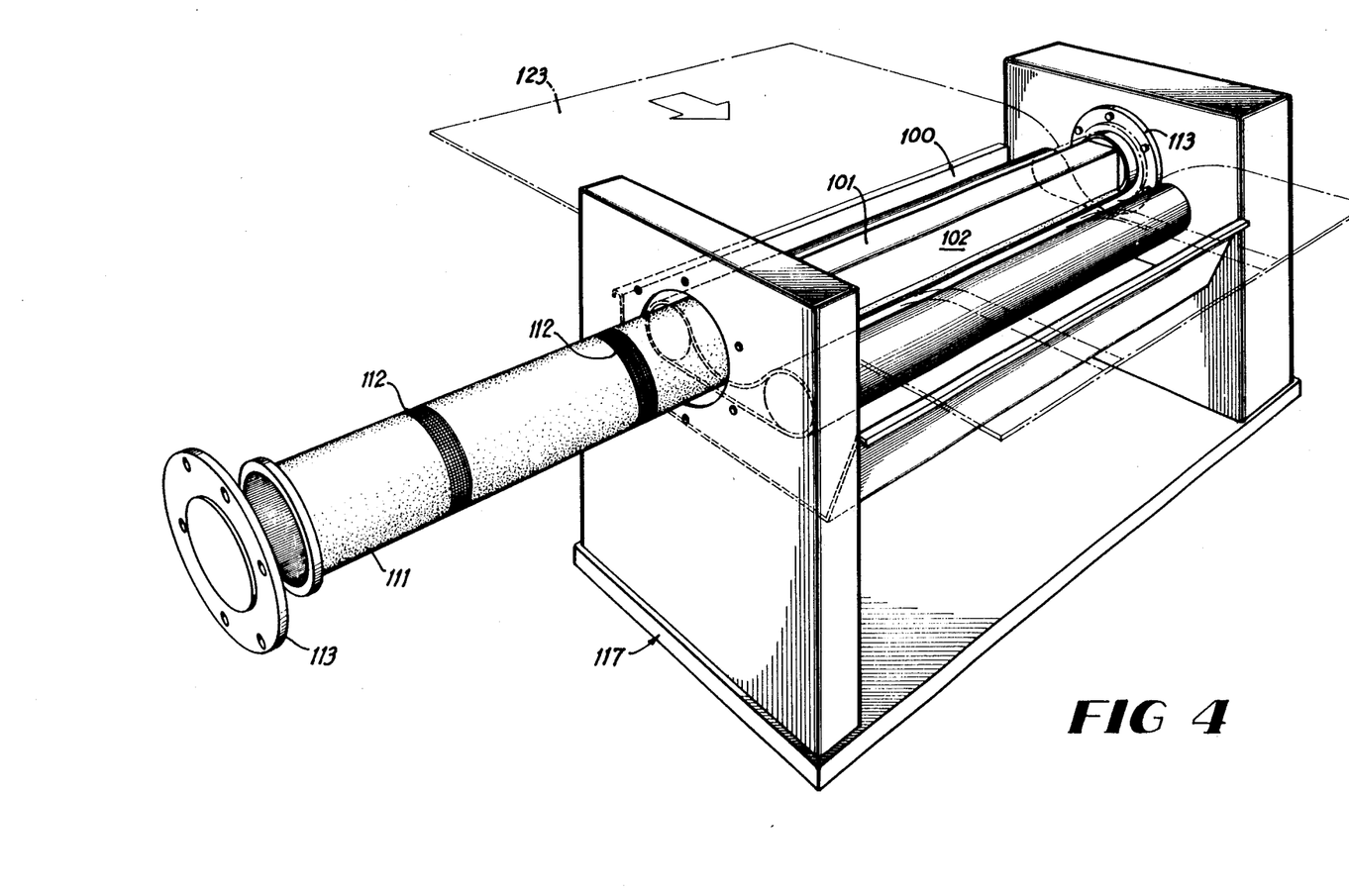
FIG. 4 is an exploded perspective view of an alternate embodiment of the present invention.
Figures 5, 6:
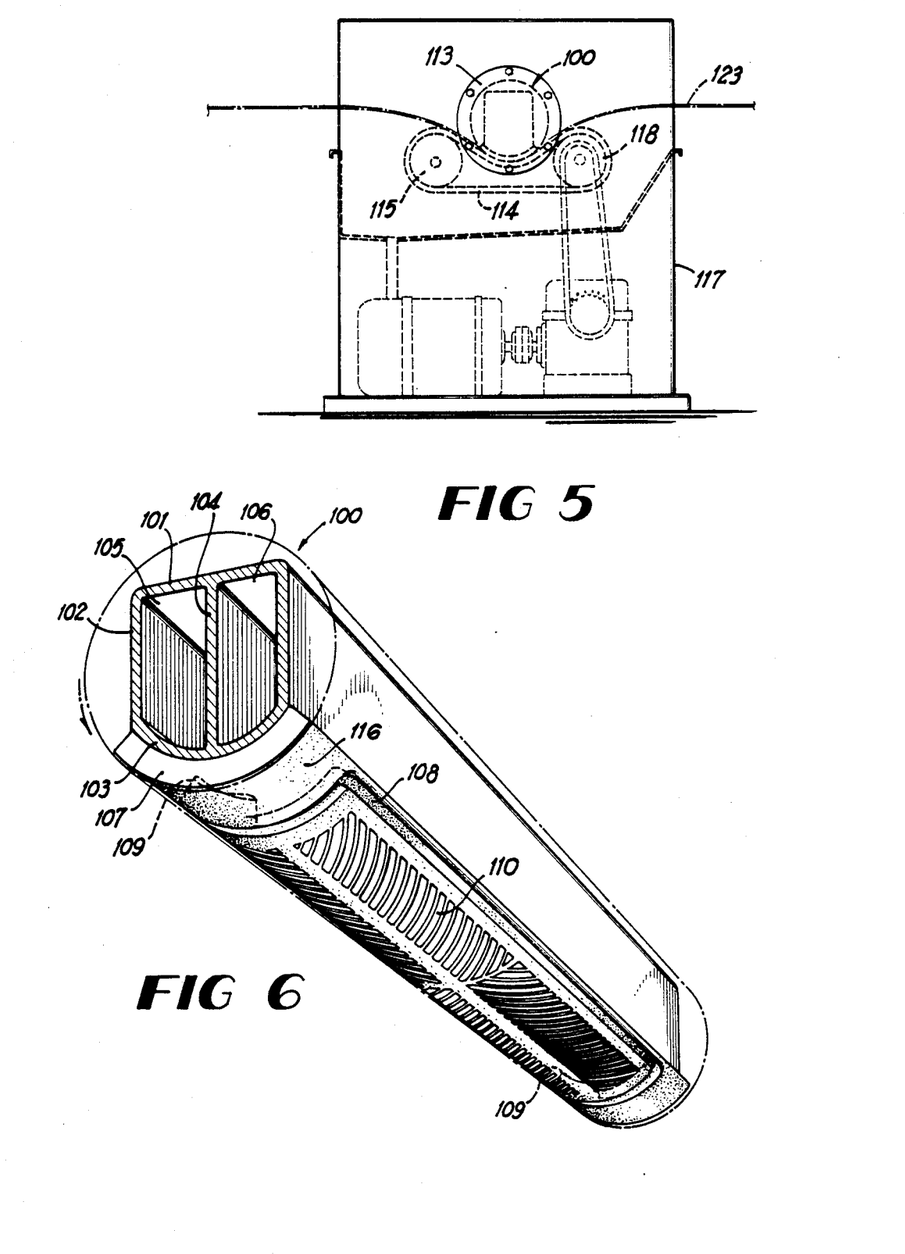
FIG. 5 is a side elevational view of the embodiment of FIG. 4.
FIG. 6 is a perspective view of the underside of the manifold assembly of FIG. 5.

In a second embodiment, depicted in FIGS. 4 through 6, an alternate manifold assembly and stencil are employed. In this embodiment, elongate manifold assembly 100 has transverse top wall 101 and downwardly extending, perpendicular side walls 102 formed thereto. Arcuate bottom wall 103 connects side walls 102, as shown in FIG. 6. Manifold assembly 100 includes interior, upstanding wall 104 which connects top wall 101 and bottom wall 103, and runs the length of assembly 100. Walls 102 and 104 define elongate vacuum chamber 105, and elongate chemical chamber 106. These chambers 105 and 106 are connected to their respective vacuum lines and chemical supply lines as discussed in reference with the first embodiment. Bottom wall 103 defines two elongate ports (not shown) running the entire length of wall 103 on either side of wall 104. These elongate ports allow for the open communication of chambers 105 and 106, respectively, to channels 110 and to web 123. Attached to and conforming to bottom wall 103 is arc-shaped plate 107, which is preferably made of polyethylene or other such material having a low coefficient of friction.

U-shaped suction channel 108 is milled into plate 107, as shown in FIG. 6. Suction channel 108 connects at each end of plate 107 to opposed suction ports 109 defined by plate 107. Each port 109 communicates with elongate ports (not shown) and vacuum chamber 105. Milled into bottom surface or wall 116 of plate 107 are herringbone channels 110, which communicate with the elongate ports (not shown) in bottom wall 103. Herringbone channels 110 are identical in function to channels 81 in wall 80 of plate 65. U-shaped channel 108 is positioned around herringbone channels 110 so as to encompass channels 110, to apply a suction to the chemically treated web 23 to remove any excess chemical. An appropriate chemical trap (not shown) is included in vacuum lines (not shown), as described in the previous embodiment, to remove excess chemical from the vacuum lines.

Cylindrical stencil 111 is received over manifold assembly 100 for rotation around assembly 100 in a counterclockwise direction from the view shown in FIGS. 4, 5 and 6. As seen in FIG. 4, the stencil 111 is cylindrical-shaped or drum-shaped, and is perforated in desired patterns, for example pattern 112, in a dot matrix arrangement similar to stencil 60, described above. Stencil 111 is journaled at either end by journal members 113. As in the first embodiment, web 123 can be driven under assembly 100 by being pulled by a suitable drive/storage roller (not shown). This drive/storage roller also serves to store treated web 123, and is positioned rearwardly of frame 117 and arranged in mechanically timed registration with stencil 111 by any suitable means well known in the art, such as a timing chain assembly, in order to ensure that stencil 111 travels in the same direction and at the same linear rate as web 123. As in the first embodiment, stencil 111 can be easily removed by removing journal member 113, and being replaced with a stencil having a different pattern 112.

Positioned below stencil 111 is endless belt 114 which is received on idler roller 115 and roller 118. Belt 114 is similar to belt 63, in that it is constructed of a non-porous material such as rubber, and can be used to create a seal when very porous web is being treated. Further, roller 118 can be mechanically driven so as to drive web 123 under assembly 100. If this arrangement is used, roller 118 is driven in timed registration with stencil 111, as previously described.

It will be obvious to those skilled in the art that many variations may be made in the embodiments here chosen for the purpose of illustrating the present invention, and full result may be had to the doctrine of equivalents without departing from the scope of the present invention, as defined by the appended claims.

What is claimed is:

1. An impregnator for applying a chemical to a porous web, while said web travels in a prescribed path through said impregnator, comprising:
    (a) vacuum means for withdrawing air from the surface of and within the web;
    (b) treatment means for applying chemical to said web, wherein said treatment means is positioned along said prescribed path after said vacuum means said treatment means being located on the same side of said web as said vacuum means; and
    (c) pattern means mounted between said treatment means and said web, for restricting the application of said chemical onto said web to preselected areas of said web.

2. The impregnator defined in claim 1, wherein said pattern means defines passageways arranged in a dot matrix pattern.

3. The impregnator defined in claim 1, further comprising drive means for passing said web through said impregnator.

4. The impregnator defined in claim 1, wherein said vacuum means and said treatment means are adjacent to each other in one manifold.

5. The impregnator defined in claim 1, further comprising means arranged rearwardly of said treatment means for removing excess chemical from said web.

6. An apparatus for impregnating the surface of a web with a liquid in the form of a pattern, comprising a vacuum chamber having a suction wall with one or more openings therein; means for pulling and controlling a vacuum on said vacuum chamber; an impregnating chamber adapted to hold the liquid impregnant, said chamber having an exit wall with one or more openings therein, the exit wall being substantially an extension of the suction wall of the vacuum chamber; a pattern belt having an inner surface and an outer surface and perforations in the configuration of the desired pattern, said belt being mounted over the outside of said vacuum and impregnating chambers and being substantially unperforated except in the area of said pattern; means for moving the pattern belt past first the suction wall of the vacuum chamber and then the exit wall of the impregnating chamber, with the inner surface of the belt being in sealing engagement with the outside surfaces of both said walls; means for pressing the fibrous web to be treated against the outer surface of said pattern belt; and means for conveying said web past said suction and exit walls in synchrony with said pattern belt.

7. The apparatus of claim 6, further including a second vacuum chamber also having a suction wall with one or more openings therein, said second suction wall being a substantially coplanar extension of the exit wall of the impregnating chamber and adapted to remove by suction any excess impregnant liquid left on the surface of the web after it passes beyond the openings in the exit wall of said impregnating chamber, and means for pulling a vacuum on said second vacuum chamber.

8. The apparatus of claim 7, wherein the suction wall of the first vacuum chamber has a plurality of openings arranged in a staggered fashion in the direction of travel of the pattern belt so that all points of the belt, except the borders, will pass over at least one of said openings in the suction wall when the belt is moved past the wall.

9. The apparatus of claim 8, wherein the exit wall of the impregnation chamber has a plurality of openings arranged in a staggered fashion in the direction of travel of the pattern belt, so that substantially all points on the belt, except the borders, will pass over at least one of said openings in the exit wall when the belt is moved past the wall.

10. The apparatus of claim 9, wherein the suction wall of the second vacuum chamber has a single opening therein in the form of a slot that is substantially perpendicular to the direction of travel of the pattern belt and substantially spans the width of said belt.

11. The apparatus of claim 10, wherein the pattern belt is an endless belt.

12. The apparatus of claim 11, wherein the means for moving the pattern belt, for pressing the web against the pattern belt, and for conveying the web are an endless, revolving conveyor belt carried by a pair of rollers mounted so as to press a portion of the outer surface of the conveyor belt against a portion of the outer surface of the pattern belt, said portions of the two belts spanning all of said suction and exit walls of the vacuum and impregnating chambers.

13. The apparatus of claim 12, wherein the vacuum and impregnating chambers are housed in a stationary drum, with said suction and exit walls being segments of the round wall of the drum, and the pattern belt is a rotatable sleeve mounted over the outer surface of the round wall of said drum.

14. The apparatus of claim 13, wherein the openings in the suction wall of the first vacuum chamber and in the exit wall of the impregnating chamber are a series of slots arranged in a herringbone pattern, with the slots being aligned at an acute angle to the direction of travel of the pattern belt.

15. The apparatus of claim 11, wherein the suction and exit walls of the vacuum and impregnating chambers all lie in the same flat plane, the pattern belt has a circumferential line of drive holes therein, and the means for moving the pattern belt includes a sprocket wheel adapted to engage said drive holes and turn said belt.

16. The apparatus of claim 15, wherein the openings in the suction wall of the first vacuum chamber and in the exit wall of the impregnating chamber are round or hexagonal holes arranged in one or more staggered rows running substantially perpendicular to the direction of travel of the pattern belt.

17. The apparatus of claim 16, wherein the pattern belt and stationary plate are both horizontally mounted and the vacuum and impregnating chambers are disposed above the stationary plate, with the suction and exit walls facing said plate.

18. The apparatus of claim 17, additionally including a spring-loaded roller mounted inside said pattern belt for applying tension to said belt.

19. The apparatus of claim 18, additionally including a take-up roller mounted inside said pattern belt on an adjustable arm which can be locket at various positions, thereby allowing the rollers to hold pattern belts of different lengths.

20. The apparatus of claim 19, wherein all of the rollers and chambers are held suspended above the stationary flat plate by one end only by support means that are all located on the same side of the pattern belt, so as to enable the pattern belt to be removed and replaced by sliding it off the free ends of said rollers.

21. The apparatus of claim 6, wherein the pattern of the perforations in the pattern belt contains a gradually lessening hole density along at least one edge of the pattern.

22. The apparatus of claim 14, wherein the pattern of the perforations in the pattern belt contains a gradually lessening hole density along at least one edge of the pattern.

23. The apparatus of claim 20, wherein the pattern of the perforations in the pattern belt contains a gradually lessening hole density along at least one edge of the pattern.

24. The apparatus of claim 14, wherein the pattern of the perforations in the pattern belt defines areas around finger holes and fold lines in a paperboard blank carton.

25. The apparatus of claim 20, wherein the pattern of the perforations in the pattern belt defines areas around fingerholes and fold lines in a paperboard blank carton.

26. The apparatus of claim 22, wherein the pattern of the perforations in the pattern belt defines areas around fingerholes and fold lines in a paperboard blank carton.

27. The apparatus of claim 23, wherein the pattern of the perforations in the pattern belt defines areas around fingerholes and fold lines in a paperboard blank carton.

28. A method of impregnating a porous web with a liquid in a pattern, comprising the following steps:
  (a) placing the web in facing engagement with the outer surface of a sheet of liquid-impervious material having perforations therein in the configuration of the desired pattern, said sheet being substantially unperforated, except in the areas of said pattern;
  (b) applying vacuum to the inner surface of the sheet, sufficient to evacuate air from the pores of the web in those areas of the web exposed to the perforations in the sheet said inner surface being located opposite said outer surface and on the opposite side of the sheet thereof;
  (c) applying the impregnant liquid to the inner surface of the sheet under a pressure sufficient to force the liquid through the perforations in the sheet and into the evacuated pores of the web; and
  (d) drying the web.

29. The method of claim 28, wherein between said steps (c) and (d), vacuum is reapplied to the inner surface of the sheet in an amount sufficient to remove excess impregnant liquid on the surface of the web.

30. The method of claim 29, conducted in a continuous manner by the web and sheet of liquid impervious material being conveyed in synchrony past a vacuum station in step (b), past a separate impregnating station in step (c), past a third station for the reapplication of the vacuum, and past a drying station in step (d).

31. The method of claim 30, wherein the web is a continuous length of paperboard.

32. The method of claim 31, wherein the pattern of the perforations in the sheet of liquid-impervious material contains a gradually lessening hole density along at least one edge of the pattern.

33. The method of claim 32, wherein the pattern of the perforations defines areas around finger holes and fold lines in a paperboard blank carton.

34. The method of claim 33, wherein the impregnant liquid is an agent for strengthening paperboard.

35. The method of claim 34, wherein the impregnant liquid is a polyurethane resin.

36. The method of claim 34, wherein the impregnant liquid is a polyisocyanate which reacts with hydroxyl groups in the paperboard to form a cured polyurethane reinforcement.

37. The method of claim 36, wherein the polyisocyanate is polymethylene polyphenylisocyanate.

* * * * *

UNITED STATES PATENT AND TRADEMARK OFFICE
CERTIFICATE OF CORRECTION

PATENT NO. : 4,968,534
DATED : November 6, 1990
INVENTOR(S) : Bogardy

It is certified that error appears in the above—identified patent and that said Letters Patent is hereby corrected as shown below:

Column 11, line 58, change "plane" to --stationary plate--.

Column 12, line 11, change "locket" to --locked--.

Signed and Sealed this

Third Day of March, 1992

Attest:

HARRY F. MANBECK, JR.

*Attesting Officer*                *Commissioner of Patents and Trademarks*